(12) United States Patent
Perlman et al.

(10) Patent No.: US 7,814,318 B1
(45) Date of Patent: *Oct. 12, 2010

(54) SCALABLE FILE SYSTEM CONFIGURED TO MAKE FILES PERMANENTLY UNREADABLE

(75) Inventors: Radia J. Perlman, Sammamish, WA (US); Donald D. Crouse, Plano, TX (US)

(73) Assignee: Oracle America, Inc., Redwood Shores, CA (US)

(*) Notice: Subject to any disclaimer, the term of this patent is extended or adjusted under 35 U.S.C. 154(b) by 918 days.

This patent is subject to a terminal disclaimer.

(21) Appl. No.: 11/237,478

(22) Filed: Sep. 27, 2005

(51) Int. Cl.
*H04L 9/32* (2006.01)

(52) U.S. Cl. ............ 713/165; 713/185; 380/277; 380/278; 709/224; 709/207; 709/206

(58) Field of Classification Search ............ 380/201, 380/278, 4, 9, 21, 23, 25, 30, 49, 50, 59, 380/200, 255, 277–287; 713/193, 189, 157, 713/150, 155, 168, 229, 201
See application file for complete search history.

(56) References Cited

U.S. PATENT DOCUMENTS

| | | | |
|---|---|---|---|
| 6,134,660 A * | 10/2000 | Boneh et al. | 713/189 |
| 6,405,315 B1 * | 6/2002 | Burns et al. | 713/190 |
| 7,333,616 B1 * | 2/2008 | Brettle et al. | 380/277 |
| 2001/0019614 A1 * | 9/2001 | Madoukh | 380/277 |
| 2002/0166053 A1 * | 11/2002 | Wilson | 713/189 |
| 2002/0191797 A1 | 12/2002 | Perlman | 380/281 |
| 2005/0066174 A1 | 3/2005 | Perlman | 713/176 |
| 2005/0066175 A1 | 3/2005 | Perlman | 713/176 |

OTHER PUBLICATIONS

Publication: "*A Revocable Backup System*" By Boney and Lipton, In Proceedings 6th USENIX Security Conference, pp. 91-96, 1996.

* cited by examiner

*Primary Examiner*—Pramila Parthasarathy
(74) *Attorney, Agent, or Firm*—Park, Vaughan & Fleming LLP (57) ABSTRACT

One embodiment of the present invention relates to a system for managing files which facilitates making the files permanently unreadable. During operation, the system maintains file-class keys at a file manager, wherein the file-class keys are associated with different classes of files. If a file belongs to a class of files, the system ensures that whenever the file is stored or updated in non-volatile storage that the file is encrypted with an associated key-manager-file-class key for the class of files. The system makes an entire class of files permanently unreadable by causing an associated key-manager-file-class key, which can be used to decrypt the class of files, to become permanently unreadable.

16 Claims, 4 Drawing Sheets

| F-DERIVATION TABLE 510 |
| --- |
| ⋮ |
| $\{F_{t-1}\}\ F_{t-2}$ |
| $\{F_t\}\ F_{t-1}$ |
| $\{F_{t+1}\}\ F_t$ |
| $\{F_{t+2}\}\ F_{t+1}$ |
| ⋮ |

FIG. 5B

SCALABLE FILE SYSTEM CONFIGURED TO MAKE FILES PERMANENTLY UNREADABLE

BACKGROUND

1. Field of the Invention

The present invention relates to techniques for encrypting and decrypting data. More specifically, the present invention relates to a scalable file system which is configured to efficiently maintain encrypted files.

2. Related Art

To ensure data is not lost prematurely, it is common to create multiple backup copies of the data. However, it is also desirable in some cases to ensure that a file, once deleted, is not recoverable. This can be a rather complicated task if backup copies of the data are created and stored at different locations.

This problem can be solved by only storing the data in encrypted form. In this way, destroying the data is a somewhat easier problem because only the key must be deleted. However, long-term user keys can, over time, be obtained by an adversary through compromise or coercion. To remedy this problem, it is possible for keys to be kept in tamper-resistant smart cards, in which case it is not feasible to covertly discover the keys. To delete the data, the user need only destroy the smart card. However, it is expensive to require every user to have a smart card and every computer to have a smart card reader.

A more-sophisticated technique for managing secret keys (developed by a company called "Disappearing Inc.") uses a special server called an "ephemerizer" (also referred to as a "key manager") whose job it is to create and destroy keys. A nice property of this technique is that the ephemerizer can be built so it does not see any data. However, the ephemerizer must create and store a key for every ephemerally-created message. This can involve storing a large amount of data if the system is used to encrypt many messages. (Also see a related system disclosed in U.S. Pat. No. 6,363,480, entitled "Ephemeral Decryptability," by inventor Radia J. Perlman.)

This storage-space problem can be alleviated by modifying the ephemerizer so that it only maintains one key per expiration time, and having that key used across many users and many files. See U.S. patent application Ser. No. 10/959,928, filed on 5 Oct. 2004, entitled "Method and Apparatus for Using Secret Keys to Make Data Permanently Unreadable," by inventor Radia J. Perlman. This application is hereby incorporated by reference to disclose how an ephemerizer operates.

A similar scheme, which uses public ephemerizer keys, is more secure, and more efficient because encryption does not require interaction with the ephemerizer. This scheme is described in pending U.S. patent application Ser. No. O' 09/880,470, entitled, "Secure Ephemeral Decryptability," by inventor Radia J. Perlman (filed 13 Jun. 2001), and in Sun Microsystems Laboratory Technical Report No. TR-2005-140, entitled, "The Ephemerizer: Making Data Disappear," February 2005.

However, the above-described solutions do not solve a number of problems that arise while building a file system that stores data in encrypted form. The straightforward way to build such a file system is to have each file encrypted with a key K, chosen at random for that file. Then if that file is to expire, K is encrypted with an appropriate key eph of the ephemerizer (one that will expire at the appropriate time). For robustness, K could also be encrypted with another ephemerizer's key. So {K} eph1, and (K)eph2 would be stored, in addition to the encrypted file. A logical place to store these encrypted keys is in the metadata for the file. However, since public keys are typically at least a thousand bits long, storing the key K encrypted with two ephemerizer keys would require about 2000 additional bits of storage space in the metadata. This significantly increases the size of the metadata and thereby significantly increases storage overhead of the file system.

The above-described solution also requires the file system to interact with the ephemerizer each time any file is opened, which increases communication overhead and also increases time required to open a file.

Hence, what is needed is a file system that facilitates making data disappear without the above-described problems.

SUMMARY

One embodiment of the present invention relates to a system for managing files which facilitates creating encrypted files so that keys to aid in decrypting the files can be separately managed. During operation, the system maintains file-class keys at a file manager, wherein the file-class keys are associated with different classes of files. If a file belongs to a class of files, the system ensures that whenever the file is stored or updated in non-volatile storage that the file is encrypted with an associated file-class key for the class of files. The system makes an entire class of files permanently unreadable by causing an associated key-manager-file-class key, which can be used to decrypt the class of files, to become permanently unreadable.

In a variation on this embodiment, while maintaining the file-class keys at the file manager, the system stores the file-class keys in unencrypted form in volatile storage. The system also stores the file-class keys in encrypted form in non-volatile storage, wherein corresponding key-manager-file-class decryption keys that can be used to decrypt the encrypted file-class keys are maintained by one or more key managers, and are not typically maintained in non-volatile form by the file manager. In this way, if the file manager crashes and loses the contents of local volatile storage, the file manager must interact with the one or more key managers to decrypt the encrypted file-class keys.

In a further variation, the system encrypts/decrypts a file by first examining state information for the file to obtain references to one or more file-class keys for the file. Next, the system uses the references to lookup the one or more file-class keys for the file in volatile storage. Finally, the system uses the one or more file-class keys to perform the encryption/decryption operation.

If during the above-described look up process the system determines that a file-class key is not present in volatile storage, the system retrieves an encrypted version of the file-class key from non-volatile storage. The system then communicates with one or more key managers to decrypt the encrypted version of the file-class key, and stores the decrypted file-class key in volatile storage.

If there is no encrypted version of the file-class key in non-volatile storage, then the file system chooses a key F, and encrypts F with relevant key-manager-file-class keys, and stores the encrypted version of F in the encrypted F-table. The file system also stores an unencrypted version of F in volatile storage.

In a further variation, different classes of files are associated with different expiration times. In this variation, the system makes a file-class key for a given class of files permanently unreadable at the expiration time for the given class of files.

In a further variation, each file-class key which is associated with an expiration time is derivable from a file-class key for a preceding expiration time. In this way, if the file manager crashes and loses the contents of its local volatile storage, the file manager can interact with a key manager to decrypt a soonest-to-expire file-class key, and can then locally-derive file-class keys for successive expiration times without having to interact with the key manager again.

In a further variation, the corresponding key-manager-file-class decryption keys, maintained by the one or more key managers, are also associated with expiration times. The key managers forget these corresponding key-manager-file-class decryption keys after the associated expiration times.

In a further variation, storing a given file-class key in encrypted form in non-volatile storage involves storing multiple encrypted copies of the given file-class key, wherein each copy is encrypted with a different key-manager-file-class key managed by a different key manager, whereby any one of the multiple key managers can be communicated with to decrypt the given encrypted file-class key.

In a further variation, while storing a given file-class key in encrypted form in non-volatile storage, the system partitions the given file-class key into n shares, such that the given file-class key can be reconstructed from any k of the n shares. Next, the system encrypts each share with a key-manager-file class key managed by a different key manager. In this way, if the file manager crashes and loses the contents of local non-volatile storage, as long as k key managers remain available, the given file-class key can be decrypted.

DETAILED DESCRIPTION

The following description is presented to enable any person skilled in the art to make and use the invention, and is provided in the context of a parti-cular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Overview

This present invention is useful in a file system that stores many files. Since the file system must be trusted to enforce access restrictions on files, there is no loss of security by having all files with the same expiration date be encrypted with the same key. For instance, all files expiring on January 3rd could be encrypted with the same key, $F_{Jan3}$, and all files expiring on January 7th could be encrypted with $F_{Jan7}$.

The file system keeps, in nonvolatile storage, each key F encrypted with one or more ephemerizer keys. When a file with expiration time of January 3rd is opened, if the file system does not already have $F_{Jan3}$ stored in unencrypted form in volatile storage (because another file with that expiration date was already opened), then the file system interacts with one of the ephemerizers (or k of the ephemerizers, if $F_{Jan3}$ is stored with a k-out-of-n scheme) in order to decrypt $F_{Jan3}$.

After $F_{Jan3}$ is decrypted, the file system keeps $F_{Jan3}$ in volatile storage in case it is needed for decrypting another file with that same expiration date. However, the file system keeps the decrypted $F_{Jan3}$ only in volatile storage, and never swaps it out to disk.

With this scheme, the metadata only needs to hold the expiration time rather than a key, or an encrypted key, which reduces the size of the metadata for the file. Furthermore, an interaction with the ephemerizer is only needed once per expiration time, rather than once per file. This allows a file system to be much more scalable, and to interact with the ephemerizer less often, which allows the ephemerizer to support more clients.

The present invention is described in more detail below.

File Manager and Key Manager

Figure 1:
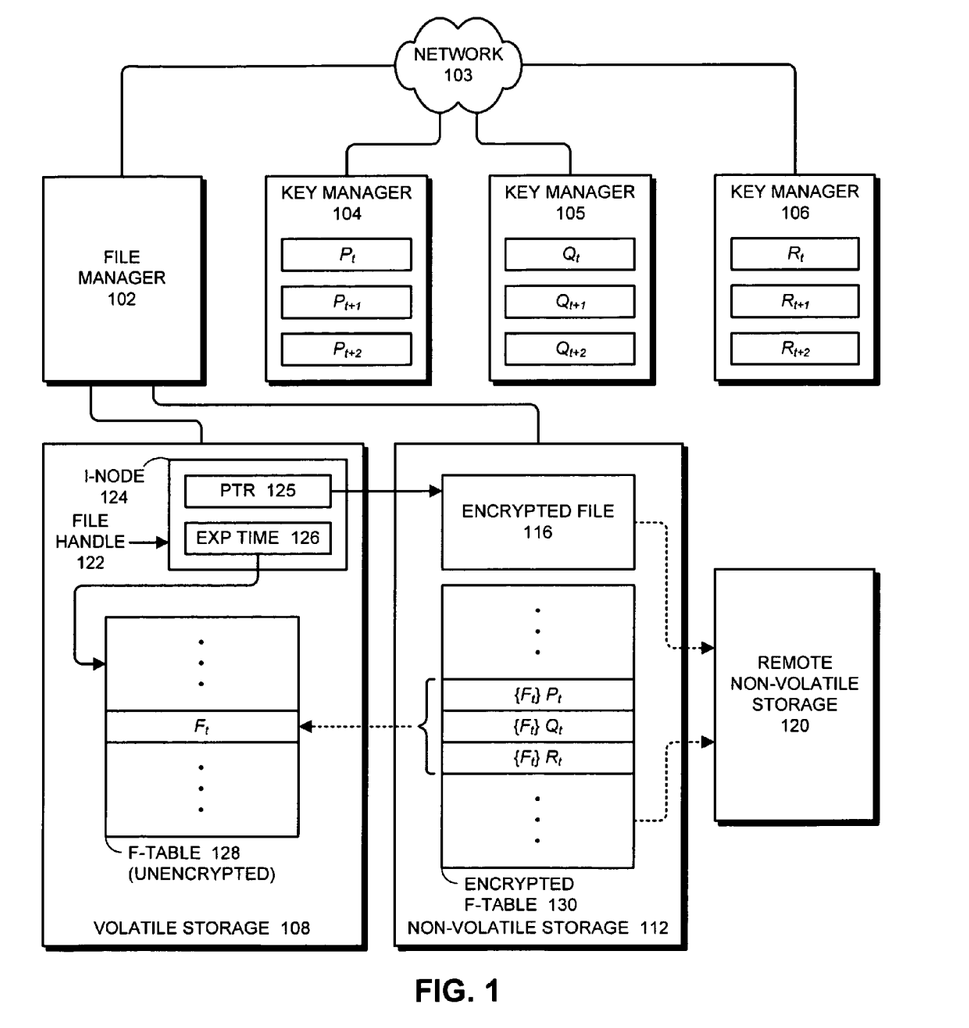
FIG. 1 illustrates both a file manager and associated key managers in accordance with an embodiment of the present invention.

FIG. 1 illustrates both a file manager 102 and a number of key managers 104-106 in accordance with an embodiment of the present invention. File manager 102 can generally include any type of computer system or device that can manage files. Note that all accesses to files are performed though file manager 102, which is trusted to enforce access restrictions, and which can access everything except deleted data.

File manager 102 is coupled to both volatile storage 108 and non-volatile storage 112. Volatile storage 108 can include any type of semiconductor-based random access memory, such as SRAM or DRAM memory. Non-volatile storage 112 can include any type of non-volatile memory that can hold data when powered down. This includes, but is not limited to, magnetic storage, flash memory, ROM, EPROM, EEPROM, and battery-backed-up RAM. As is illustrated by dashed lines in FIG. 1, backups of items in non-volatile storage 112 are periodically propagated to remote non-volatile storage 120, or alternatively, to a local backup device, such as a tape drive.

File manager 102 communicates with a number of key managers 104-106. These key managers 104-106 are similar in concept to the "ephemerizer" described in U.S. Pat. No. 6,363,480, entitled "Ephemeral Decryptability," by inventor Radia J. Perlman. Also see a related system in U.S. patent application Ser. No. 10/959,928, filed on 5 Oct. 2004, entitled "Method and Apparatus for Using Secret Keys to Make Data Permanently Unreadable," by inventor Radia J. Perlman, which is incorporated by reference herein to describe how to implement a key manager.

The key managers 104-106 maintain keys associated with different classes, e.g., expiration times. Note that although the present invention is described in the context of keys that are associated with sequential expiration times, such as t, t+1 and t+2, the present invention is not limited to such sequential keys. In general, some of the keys might be sequenced and some of them may not be sequenced. Also, note that sequential keys do not have to be time-dependent. Sequential keys only need to have a logical sequence, so that if key i is supposed to go away, all keys for j<i should also go away. There might exist a project where you expire the entire project (the highest numbered i) or a piece of it (a lower number i) or a piece of the piece (an even lower numbered i).

Referring back to FIG. 1, key manager 104 maintains a sequence of keys, including keys $P_t$, $P_{t+1}$, $P_{t+2}$; key manager 105 maintains a sequence of keys, including keys $Q_t$, $Q_{t+1}$, $Q_{t+2}$; and key manager 105 also maintains a sequence of keys, including keys $R_1$, $R_{t+1}$, $R_{t+2}$. In one embodiment of the present invention these keys are private/public key pairs. In another embodiment, these keys are symmetric keys.

File manager 102 also maintains encrypted files (such as encrypted file 116) in non-volatile storage 112. File manager 102 additionally maintains a number of data structures to keep track of encryption/decryption keys for these encrypted files. More specifically, file manager 102 maintains an "F-table" 128 in volatile storage 108, which contains unencrypted versions of encryption/decryption keys for each desired expiration time (perhaps one key for each day). For example, F-table 128 in FIG. 1 includes file-class key $F_t$, which is associated with expiration time t. Note that unlike the ephemerizer described in U.S. patent Ser. No. 10/959,928 cited above, the present invention maintains file-class keys for each expiration time locally at the file manager, which eliminates the need to continually query the key manager to use these file-class keys.

A corresponding encrypted version of F-table 128 (referred to as encrypted F-table 130) is stored in non-volatile storage 112. Encrypted F-table 130 includes encrypted versions of the keys from F-table 128. For example, the key $F_t$ from F-table 128 can be encrypted with keys $P_t$, $Q_t$ and $R_t$ belonging to key managers 104, 105 and 106, respectively, to form encrypted keys $\{F_t\}P_t$, $\{F_t\}Q_t$, $\{F_t\}R_t$. These encrypted keys can then be stored in encrypted F-table 130. Note that storing multiple versions of the encrypted key $F_t$ allows file manager 102 to interact with any one of key managers 104-106 to decrypt $F_t$.

To provide an additional level of fault-tolerance, file manager 102 can additionally maintain backup copies encrypted file 116 and encrypted F-table 130 in remote non-volatile storage 120.

File manager 102 also maintains metadata for each file. For example, in FIG. 1 file manager 102 maintains an I-node 124 containing metadata for encrypted file 116, which can be referenced through a file handle 122. (Note that I-node 124 is generally stored in non-volatile storage 112. However, when file manager 102 needs to access I-node 124, file manager 103 makes a copy of I-node 124 in volatile storage 108.) I-node 124 maintains at least one pointer to a data block 125, and an expiration time 126 (or some other type of reference), which can be used to lookup the related encryption/decryption keys for the associated encrypted file 116 in F-table 128. I-node 124 also contains a reference to encrypted file 116 in non-volatile storage 112.

If file manager 102 crashes, it interacts with key managers 104-106 to decrypt the keys in encrypted F-table 130, and to store the decrypted keys in F-Table 128 in volatile storage 108. This process is described in more detail below with reference to FIG. 4.

Note that interactions between file manager 102 and key managers 104-106 can be accomplished with blind decryption (as explained in the Sun Microsystems Laboratory Technical Report No. TR-2005-140, entitled, "The Ephemerizer: Making Data Disappear," February 2005), or it can be accomplished with any sort of secure exchange with key managers 104-106, such as using the SSL (Secure Socket Layer) protocol or using the IPsec (IP security) protocol, wherein the protocol uses either public keys or shared secret keys.

Also, note that the keys in F-table 128 can be encrypted in a k-out-of-n scheme with n key managers, such that as long as k key managers are available (and haven't prematurely lost the key), the keys in F-table 128 are decryptable, and as long as n−k+1 of the key managers do indeed delete their keys when demanded, the encrypted keys become unreadable.

Note that keys $P_t$, $Q_t$ and $R_t$ can be public keys or secret keys. If the keys are blindable (through for instance, one of the three functions described in the above-referenced Sun Microsystems Laboratory Technical Report and in the above-referenced patent documents), then interaction with the key manager can be accomplished through blind decryption, which will be more secure.

If the environment is such that there is no possibility for eavesdroppers, then there can be a simple interaction where the encrypted key $\{F_t\}P_t$ is sent to the key manager 104, which returns the decrypted key $F_t$, or where the key manager's key $P_t$ is sent to the file manager 102, which retains $P_t$, but only in volatile storage 108. The most secure way of doing this, though, is to use public keys for the key manager, and blind decryption.

Note that the communications between the file manager and the key manager can be accomplished through some secure interaction, such as doing mutual authentication based on shared secrets or public keys, and establishing a security association through a protocol such as IPsec or SSL, and then having the key manager send the secret key, or encrypt a secret key of the file manager's choice (to be used for encrypting the key database).

Alternatively, the key managers 104 can send the file manager 102 a public key. This public key can also be learned by the file manager securely through other means, such as a certificate, signed by someone that file manager trusts, being posted in a place accessible to the file manager.

Obtaining and Storing a File-Class key

Figure 2:
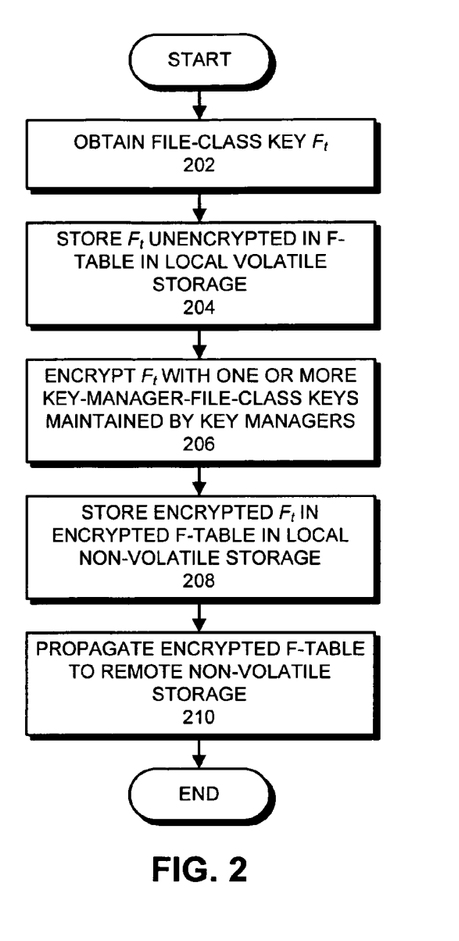
FIG. 2 presents a flow chart illustrating how a file-class key is obtained and stored by a file manager in accordance with an embodiment of the present invention.

FIG. 2 presents a flow chart illustrating how a file-class key is obtained and stored by file manager 102 in accordance with an embodiment of the present invention. First, file manager 102 obtains file-class key F, (step 202). For example, file-class key F, can be a random number, which is generated locally by file manager 102. File manager 102 then stores F, in unencrypted form in F-table 128 in volatile storage 108 (step 204). File manager 102 also encrypts F, with keys $P_t$, $Q_t$ and $R_t$ (maintained by key managers 104-106) to form encrypted keys $\{F_t\}P_t$, $\{F_t\}Q_t$, $\{F_t\}R_t$ (step 206). File manager 102 then stores these encrypted keys $\{F_t\}P_t$, $\{F_t\}Q_t$, $\{F_t\}R_t$ in encrypted F-table 130 in non-volatile storage 112 (step 208). Encrypted F-table 130 can then eventually be propagated to remote non-volatile storage 120 (step 210).

Creating an Encrypted File

Figure 3:
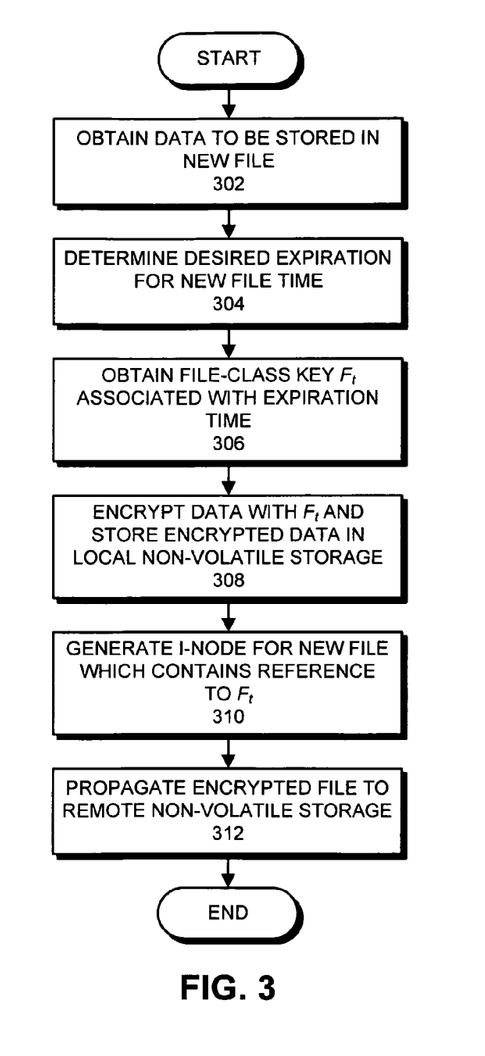
FIG. 3 presents a flow chart illustrating how an encrypted file is created in accordance with an embodiment of the present invention.

FIG. 3 presents a flow chart illustrating how a new encrypted file is created in accordance with an embodiment of the present invention. File manager 102 first obtains data to be stored in the new file (step 302).

Next, file manager 102 determines a desired expiration time t for the new file (step 304). For example, this expiration time t can be obtained from a system administrator or can be determined automatically.

File manager 102 then obtains a file-class key $F_t$ associated with the desired expiration time t (step 306). This may involve looking up a pre-existing key $F_t$ in F-table 128 if the key $F_t$ exists already, or alternatively, generating key $F_t$ if key $F_t$ does not already exist.

File manager 103 then encrypts the data with file-class key $F_t$ to form an encrypted file 116, and then stores encrypted file 116 in non-volatile storage 112 (step 308). The system also generates an I-node 124 containing metadata for the encrypted file in volatile storage 108, wherein the metadata includes a reference (such as an expiration time) which can be used to lookup key $F_t$ (step 310). This I-node 124 is also copied to non-volatile storage 112.

The system also propagates the encrypted file (including I-node 124) to remote non-volatile storage 120 (step 312).

Performing an Encryption/Decryption Operation

Figure 4:
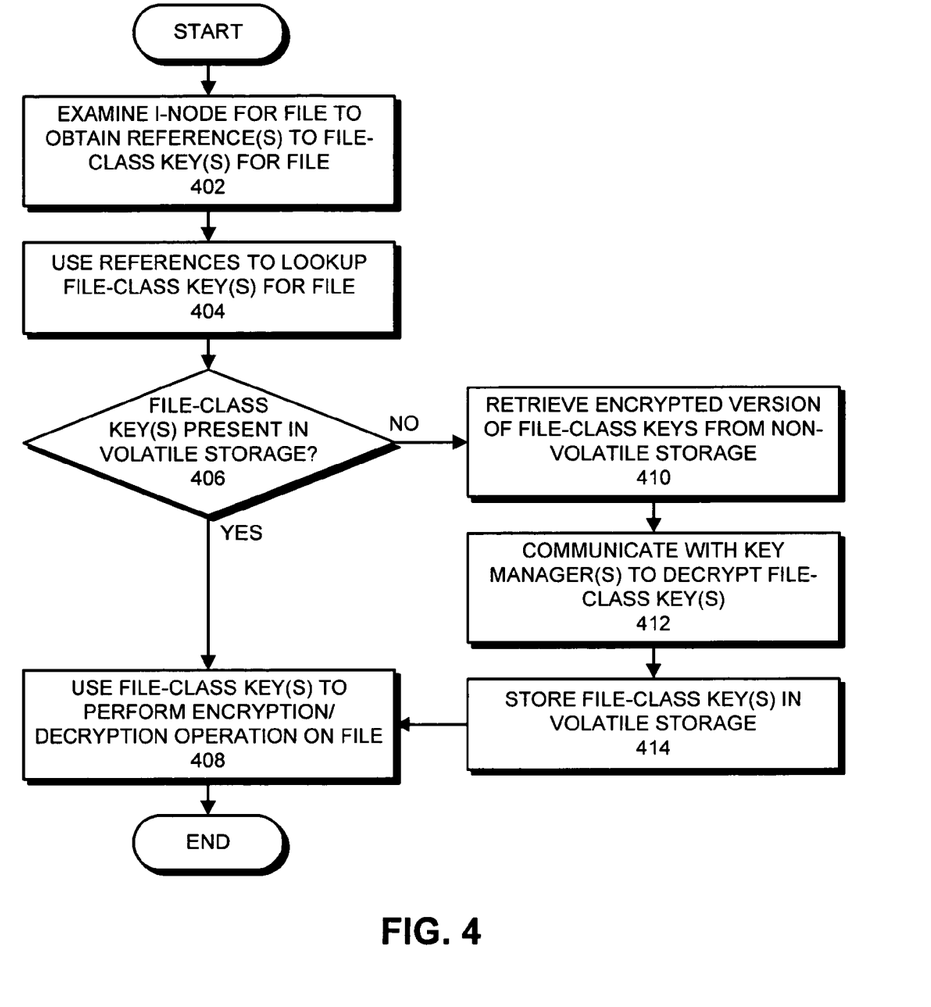
FIG. 4 presents a flow chart illustrating how an encryption/decryption operation is performed on a file in accordance with an embodiment of the present invention.

FIG. 4 presents a flow chart illustrating how an encryption/decryption operation is performed on a file in accordance with an embodiment of the present invention. Note that since the file is stored in encrypted form, it is necessary to perform decryption operations in order to read the file, and encryption operations to write or update the file. Upon receiving a request to encrypt or decrypt a file, file manager 102 examines I-node 124 to obtain references to keys (such as expiration times) (step 402). These references are then used to lookup file-class keys for the encrypted file in F-table 128 located in non-volatile storage 108 (step 404).

The system then determines if all of the file-class keys related to that file are present in volatile storage (step 406). If so, the file manager 102 uses the file-class keys to perform the desired encryption/decryption operation on the file (step 408). Otherwise, file manager 102 retrieves the encrypted versions of the missing file-class keys from encrypted F-table 130 in non-volatile storage 112 (step 410). File manager 102 then communicates with key managers 104-106 (as described above) to decrypt the encrypted versions of the missing file-class keys (step 412).

Note that upon recovering from a crash in which the contents of volatile storage 108 is lost, file manager 102 can immediately restore all of the file-class keys in F-table 128. Alternatively, file manager 102 can restore file-class keys "incrementally" as they are needed.

Next, file manager 102 stores the decrypted file-class key(s) in F-table 128 in volatile storage 108 (step 414). Once the missing file-class key(s) have been restored, the system uses the file-class key(s) to perform the desired encryption/decryption operation on the file (step 408).

Note that key managers 104-106 are responsible for deleting key-manager-file-class keys $P_t$, $Q_t$ and $R_t$ at the associated expiration times for the keys. Hence, after key-manager-file-class keys $P_t$, $Q_t$ and $R_t$ are deleted by key managers 104-106, file manager 102 cannot use key-manager-file-class $P_t$, $Q_t$ and $R_t$ to decrypt corresponding encrypted keys $\{F_t\}P_t$, $\{F_t\}Q_t$, $\{F_t\}R_t$ from encrypted F-table 130. Hence, if the file-class key $F_t$ is removed from volatile storage, then file-class key $F_t$ becomes permanently unreadable. This makes any files encrypted with key $F_t$ permanently unreadable.

Deriving File-Class Keys

Instead of the file manager having to individually decrypt each encrypted file-class key after a crash, in one embodiment of the present invention, the file-class keys for successive expiration times can be "derived" from the file-class keys for preceding expiration times. In this way, upon recovering from a crash, the file manager only has to communicate with the key manager to decrypt the soonest-to-expire file-class key. Then, successive file-class keys can be "derived" from this soonest-to-expire file-class key.

Figure 5A:
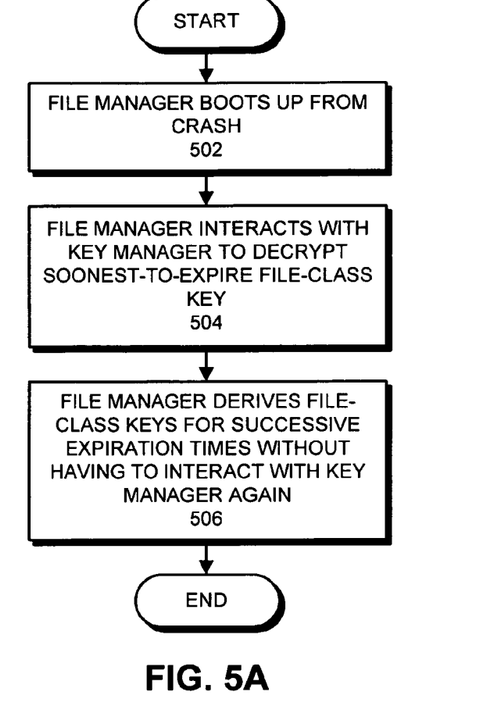
FIG. 5A presents a flow chart illustrating how a set of file-class keys is derived from a soonest-to-expire file-class key in accordance with an embodiment of the present invention.

More specifically, FIG. 5A presents a flow chart illustrating how a set of file-class keys may be derived from a soonest-to-expire file-class key in accordance with an embodiment of the present invention. The process starts when file manager 102 boots up after a crash that causes the contents of volatile storage 108 to be lost (step 502). After the boot process, the file manager 102 interacts with key managers 104-106 to decrypt the soonest-to-expire file-class key(s) (step 504). File manager 102 then derives successive file-class keys from the soonest-to-expire file-class key(s) without having to interact with key managers 104-106 again (step 506).

There are a number of ways that file-class keys can be derived from preceding file-class keys. One way is to use a one-way function, such as a hash function, to compute each successive key from a preceding key.

Figure 5B:
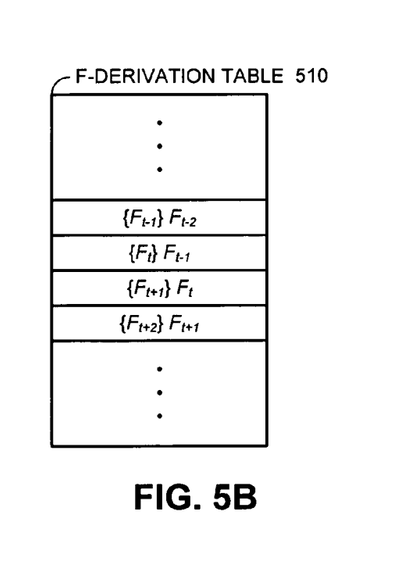
FIG. 5B illustrates an F-derivation table which facilitates deriving file-class keys from preceding file-class keys in accordance with an embodiment of the present invention.

Another way is to use an F-derivation table 510 as is illustrated in FIG. 5B. This F-derivation table 510 stores encrypted keys, such as encrypted key $\{F_t\}F_{t-1}$ which is formed by encrypting a file-class key $F_t$ with its preceding file-class key $F_{t-1}$. More specifically, the F-derivation table 510 in FIG. 5B stores a sequence of encrypted file-class keys, including keys $\{F_{t-1}\}F_{t-2}$, $\{F_t\}F_{t-1}$, $\{F_{t+1}\}F_t$, and $\{F_{t+2}\}F_{t+1}$. Upon booting up from a crash, file manager 102 obtains a soonest-to-expire file-class key $F_t$ by retrieving an encrypted version of $F_t$ from encrypted F-table 130, and then communicating with one or more key managers to decrypt $F_t$. The system then uses $F_t$ and the F-derivation table 510 to derive all successive file-class keys.

Classes of Files

Although the embodiment of the present invention described above associates files with specific expiration times, the present invention is not limited to associating files by expiration times. In general, the present invention can be used to partition files into different classes, wherein each class is associated with a different encryption/decryption key. This enables an entire class of files to be deleted by making the corresponding encryption/decryption key unreadable.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing files which facilitates key management for encrypted files, the method comprising:
   maintaining file-class keys at a file manager, wherein each file-class key is associated with a different class of files, wherein every file in the class of files is encrypted and decrypted using a same file-class key, and wherein each file in the class of files is associated with an expiration time;
   if a file belongs to a class of files, ensuring that whenever the file is stored or updated in non-volatile storage that the file is encrypted with an associated file-class key for the class of files, wherein the file-class key is stored in encrypted form in non-volatile storage;
   wherein storing the file-class key in encrypted form in non-volatile storage involves storing multiple encrypted copies of the file-class key, wherein each copy is encrypted with a different key-manager-file-class key managed by a different key manager, and wherein decrypting a copy of the file-class key involves causing one of the key managers to decrypt the encrypted file-class key using the corresponding key-manager-file-class key; and causing a class of files to become permanently unreadable by causing an associated file-class key, which can be used to decrypt the class of files, to become permanently unreadable.

2. The method of claim 1, wherein maintaining the file-class keys as the file manager involves:

storing the file-class keys in unencrypted form in volatile storage;

wherein corresponding key-manager-file-class decryption keys are not typically maintained in non-volatile form by the file manager, whereby if the file manager crashes and loses the contents of local volatile storage, the file manager must interact with the one or more key managers to decrypt the encrypted file class keys.

3. The method of claim 2, further comprising encrypting/decrypting a file by:

examining state information for the file to obtain references to one or more file-class keys for the file;

using the references to lookup the one or more file-class keys for the file in volatile storage; and using the one or more file-class keys to perform the encryption/decryption operation.

4. The method of claim 3, wherein if during the lookup process a file-class key is not present in volatile storage, the method further comprises:

retrieving an encrypted version of the file-class key from non-volatile storage;

communicating with one or more key managers to decrypt the encrypted version of the file-class key; and storing the file-class key in volatile storage.

5. The method of claim 1, wherein each file-class key which is associated with an expiration time is derivable from a file-class key for a preceding expiration time;

whereby if the file manager crashes and loses the contents of local volatile storage, the file manager can interact with a key manager to decrypt a soonest-to-expire file-class key, and can then locally derive file-class keys for successive expiration times without having to interact with the key manager again.

6. The method of claim 1, wherein corresponding key-manager-file-class decryption keys, maintained by the one or more key managers, are also associated with expiration times; and wherein the key managers forget the corresponding key-manager-file-class decryption keys after the associated expiration times.

7. The method of claim 1, wherein storing a given file-class key in encrypted form in non-volatile storage involves:

partitioning the given file-class key into n shares, such that the given file-class key can be reconstructed from any k of the n shares; and encrypting each share with a key managed by a different key manager, whereby if the file manager crashes and loses the contents of local non-volatile storage, as long as k key managers remain available, the given file-class key can be decrypted.

8. A computer-readable storage medium storing instructions that when executed by a computer cause the computer to perform a method for managing files which facilitates key management for encrypted files, the method comprising:

maintaining file-class keys at a file manager, wherein each file-class key is associated with a different class of files, wherein every file in the class of files is encrypted and decrypted using a same file-class key, and wherein each file in the class of files is associated with an expiration time;

if a file belongs to a class of files, ensuring that whenever the file is stored or updated in non-volatile storage that the file is encrypted with an associated file-class key for the class of files, wherein the file-class key is stored in encrypted form in non-volatile storage;

wherein storing the file-class key in encrypted form in non-volatile storage involves storing multiple encrypted copies of the file-class key, wherein each copy is encrypted with a different key-manager-file-class key managed by a different key manager, wherein decrypting a copy of the file-class key involves causing one of the key managers to decrypt the encrypted file-class key using the corresponding key-manager-file-class key; and causing a class of files to become permanently unreadable by causing an associated file-class key, which can be used to decrypt the class of files, to become permanently unreadable.

9. The computer-readable storage medium of claim 8, wherein maintaining the file-class keys as the file manager involves:

storing the file-class keys in unencrypted form in volatile storage;

wherein corresponding key-manager-file-class decryption keys are not typically maintained in non-volatile form by the file manager, whereby if the file manager crashes and loses the contents of local volatile storage, the file manager must interact with the one or more key managers to decrypt the encrypted file class keys.

10. The computer-readable storage medium of claim 9, wherein the method further comprises encrypting/decrypting a file by:

examining state information for the file to obtain references to one or more file-class keys for the file;

using the references to lookup the one or more file-class keys for the file in volatile storage; and using the one or more file-class keys to perform the encryption/decryption operation.

11. The computer-readable storage medium of claim 10, wherein if during the lookup process a file-class key is not present in volatile storage, the method further comprises:

retrieving an encrypted version of the file-class key from non-volatile storage;

communicating with one or more key managers to decrypt the encrypted version of the file-class key; and storing the file-class key in volatile storage.

12. The computer-readable storage medium of claim 8, wherein each file-class key which is associated with an expiration time is derivable from a file-class key for a preceding expiration time;

whereby if the file manager crashes and loses the contents of local volatile storage, the file manager can interact with a key manager to decrypt a soonest-to-expire file-class key, and can then locally derive file-class keys for successive expiration times without having to interact with the key manager again.

13. The computer-readable storage medium of claim 8,
wherein corresponding key-manager-file-class decryption keys, maintained by the one or more key managers, are also associated with expiration times; and
wherein the key managers forget the corresponding key-manager-file-class decryption keys after the associated expiration times.

14. The computer-readable storage medium of claim 8, wherein storing a given file-class key in encrypted form in non-volatile storage involves:
partitioning the given file-class key into n shares, such that the given file-class key can be reconstructed from any k of the n shares; and
encrypting each share with a key managed by a different key manager, whereby if the file manager crashes and loses the contents of local non-volatile storage, as long as k key managers remain available, the given file-class key can be decrypted.

15. An apparatus that manages files in a manner that facilitates key management for encrypted files, the apparatus comprising:
a file manager;
a key-maintenance mechanism within the file manager configured to maintain file-class keys, wherein each file-class key is associated with a different class of files, wherein every file in the class of files is encrypted and decrypted using a same file-class key, wherein each file in the class of files is associated with an expiration; time, and wherein the file-class keys are stored in unencrypted form in volatile storage, and the file-class keys are stored in encrypted form in non-volatile storage;
wherein corresponding key-manager-file-class decryption keys that can be used to decrypt the encrypted file-class keys are maintained by one or more key managers, and are not typically maintained in non-volatile form by the file manager, whereby if the file manager crashes and loses the contents of local volatile storage, the file manager must interact with the one or more key managers to decrypt the encrypted file-class keys; and
a storage mechanism within the file manager, wherein if a file belongs to a class of files, the storage mechanism ensures that whenever the file is stored or updated in non-volatile storage that the file is encrypted with an associated file-class key for the class of files; and
a deletion mechanism within the file manager, wherein the deletion mechanism is configured to cause a class of files to become permanently unreadable by causing an associated file-class key, which can be used to decrypt the class of files, to become permanently unreadable.

16. A method for managing files which facilitates key management for encrypted files, the method comprising:
maintaining file-class keys at a file manager, wherein the file-class keys are associated with different classes of files, wherein every file in each class of files is encrypted and decrypted using a same file-class key, and wherein each file in a class of files is associated with a same expiration time
if a file belongs to a class of files, ensuring that whenever the file is stored or updated in non-volatile storage that the file is encrypted with an associated file-class key for the class of files; and
causing a class of files to become permanently unreadable by causing an associated file-class key, which can be used to decrypt the class of files, to become permanently unreadable;
wherein a file-class key for a given class of files is made permanently unreadable at the expiration time for the given class of files; and
wherein each file-class key which is associated with an expiration time is derivable from a file-class key for a preceding expiration time, whereby if the file manager crashes and loses the contents of local volatile storage, the file manager can interact with a key manager to decrypt a soonest-to-expire file-class key, and can then locally derive file-class keys for successive expiration times without having to interact with the key manager again.

* * * * *